United States Patent [19]

Meyer

[11] Patent Number: 5,261,604
[45] Date of Patent: Nov. 16, 1993

[54] YAW VECTORING BLADE

[75] Inventor: Brian E. Meyer, Loveland, Ohio

[73] Assignee: General Electric Company, Cincinnati, Ohio

[21] Appl. No.: 880,767

[22] Filed: May 11, 1992

[51] Int. Cl.⁵ ............................................. F02K 1/12
[52] U.S. Cl. ........................... 239/265.19; 239/265.35; 244/23 D; 244/52
[58] Field of Search ........................ 239/265.19, 265.33, 239/265.35, 265.37, 265.39, 265.41; 60/228, 230, 271; 244/12.5, 23 D, 52, 110 B

[56] References Cited

U.S. PATENT DOCUMENTS

| | | | |
|---|---|---|---|
| 2,968,919 | 1/1961 | Hughes et al. | 239/265.37 |
| 3,743,184 | 7/1973 | Mancus | 239/265.19 |
| 3,979,067 | 9/1976 | Nash | 239/265.35 |
| 4,000,854 | 1/1977 | Konarski et al. | 239/265.35 |
| 4,266,725 | 5/1981 | Schweikl et al. | 239/265.19 |
| 4,280,660 | 7/1981 | Wooten, Jr. et al. | 239/265.35 |
| 4,848,664 | 7/1989 | Thayer | 239/265.35 |
| 4,978,071 | 12/1990 | MacLean et al. | 239/265.19 |
| 5,154,050 | 10/1992 | Herup et al. | 60/228 |

*Primary Examiner*—Andres Kashnikow
*Assistant Examiner*—Christopher G. Trainor
*Attorney, Agent, or Firm*—Jerome C. Squillaro

[57] ABSTRACT

A yaw vectoring blade which is alternatively recessed from and extended into an airflow path of an exhaust nozzle of an aircraft gas turbine engine. The yaw vectoring blade is provided with a housing cavity located in a divergent flap of the exhaust nozzle which provides a recess from the airflow path. Actuating means connected to the yaw vectoring blade can move the yaw vectoring blade into and out of the airflow path to produce a desired yawing moment.

3 Claims, 6 Drawing Sheets

YAW VECTORING BLADE

BACKGROUND OF THE INVENTION

The present invention relates to exhaust nozzles in aircraft gas turbine engines and more particularly to yaw blades for use in such nozzles.

The prior art has exhibited a number of nozzle designs which are capable of vectoring in pitch and yaw for the purpose of increasing aircraft maneuverability. However, such nozzle designs have necessitated somewhat complicated mechanical devices whose weight and bulk leads to aircraft performance penalties. Furthermore, bulky elements which control pitch and yaw in the prior art nozzles require bulky actuators to effect the desired vectoring capability.

Thus, a need is seen for an exhaust nozzle which contains a means for vectoring pitch and yaw and which is light in weight and more easily implemented by light weight actuating components.

SUMMARY OF THE INVENTION

In accordance with one form of the present invention there is provided an exhaust nozzle for an aircraft engine having an improved yaw vectoring blade and actuating mechanism. A divergent flap located at the aft of the exhaust nozzle is provided with a cavity into which the yaw vectoring blade can be retracted so as not to expose the yaw vectoring blade to an airflow path of the exhaust nozzle. However, when desired, the yaw blade is moved from a recessed position within the cavity to a position which exposes the yaw blade to the airflow path through the exhaust nozzle. The yaw blade changes the direction of the airflow path by deflecting the airflow which produces a desired yawing moment on the aircraft.

An actuating means, connected to the yaw blade, allows the yaw blade to be alternatively recessed and extended into the airflow path according to navigational needs. The resultant yaw angle produced is a function of the yaw blade height, i.e., the height of the yaw blade which is exposed to the airflow path.

The exhaust nozzle of the present invention has upper and lower divergent flaps which are each provided with right side and left side yaw blades which are recessed into complementary cavities in the upper divergent flap and lower divergent flap. The yaw blades are controlled by an actuating means which can move the respective yaw blades into and out of the airflow path to achieve a desired result, i.e., a desired yawing moment.

In an alternative embodiment, an exhaust nozzle is provided with retractable yaw blades which are housed in cavities on opposite sidewalls of the nozzle.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

Figure 4:
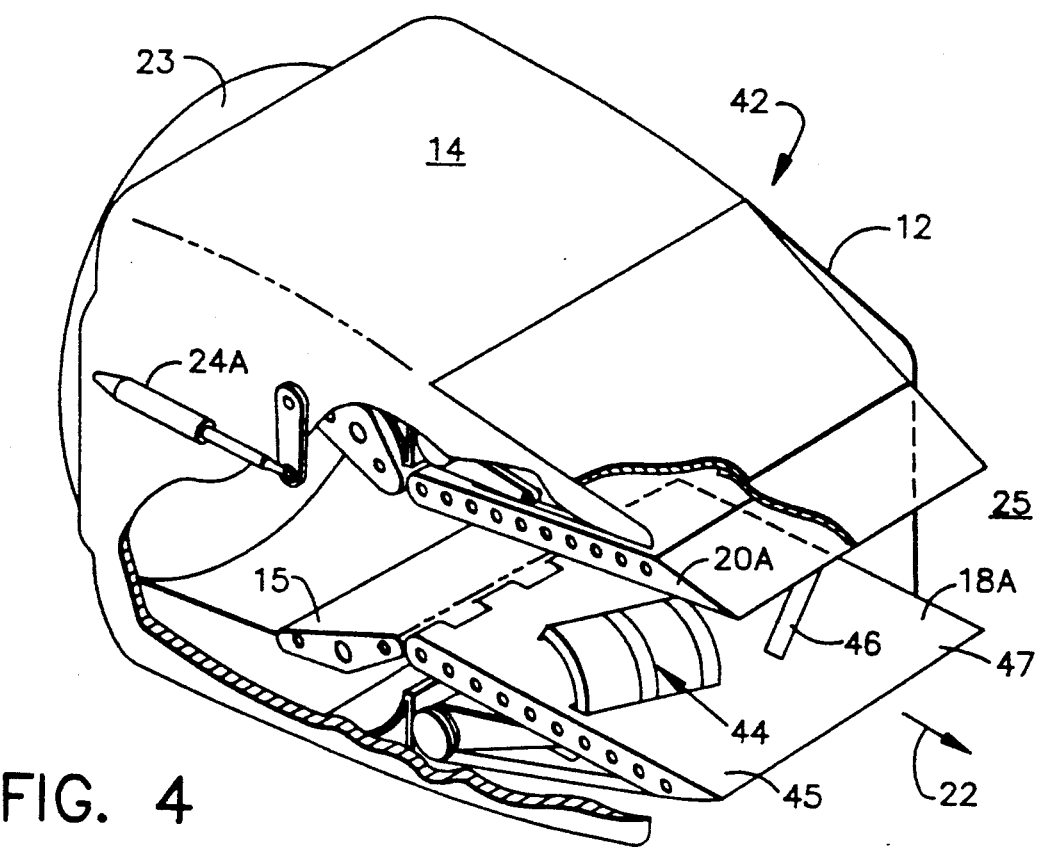
FIG. 4 is a partial cutaway perspective illustration of a nozzle which is provided with yaw blades which are retractable into a divergent flap according to one embodiment of the present invention.
Figure 6:
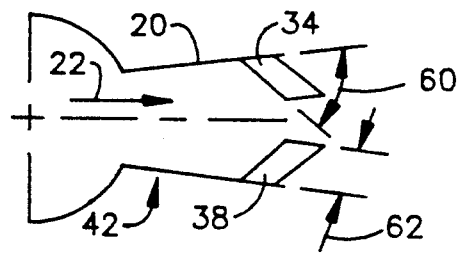
Figure 7:
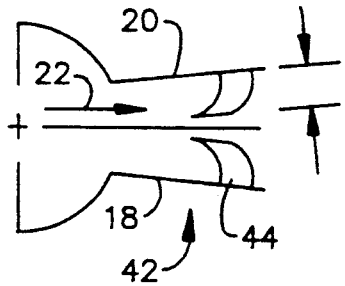
Figure 8:
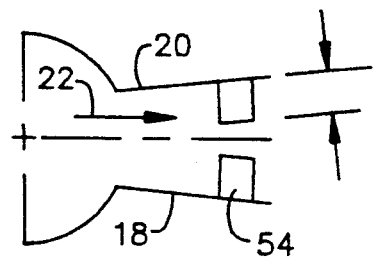
Figure 9:
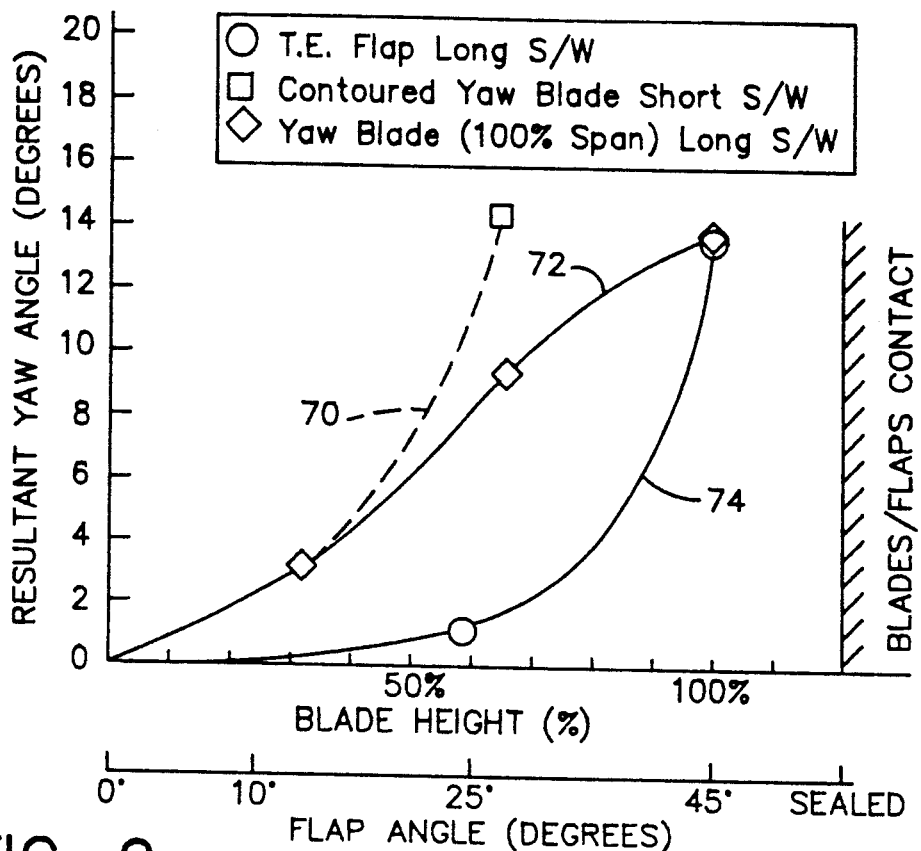
Figure 10:
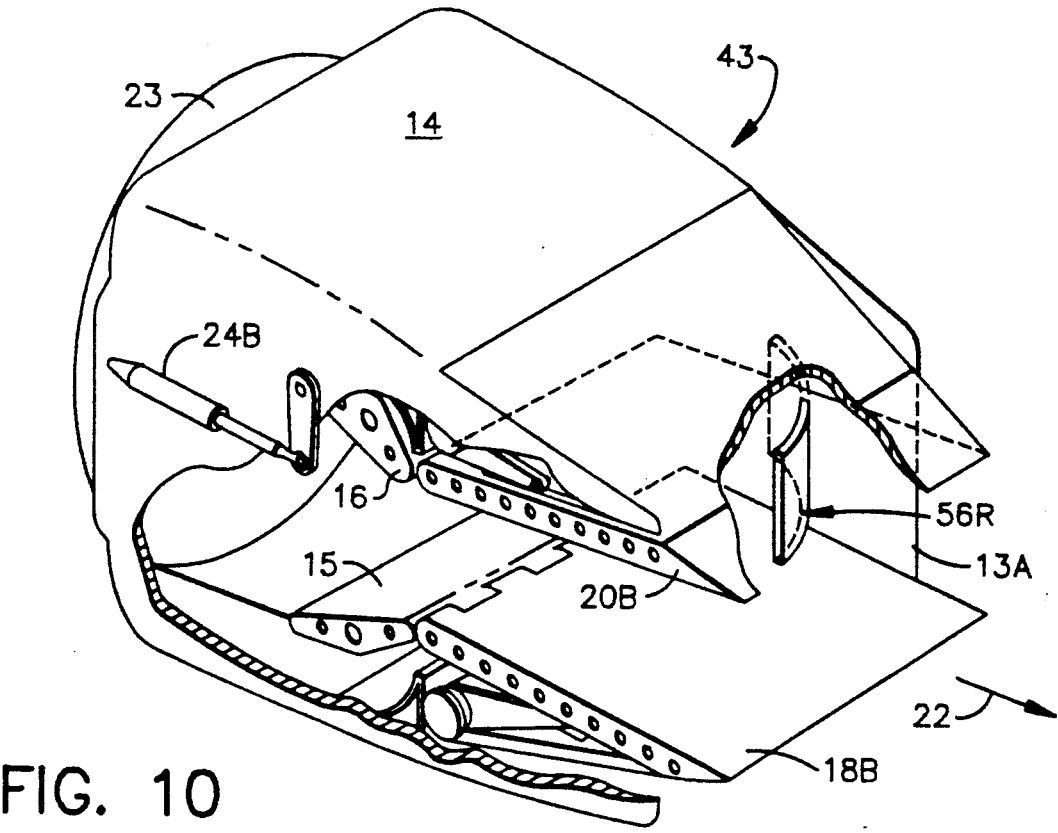
Figure 11:
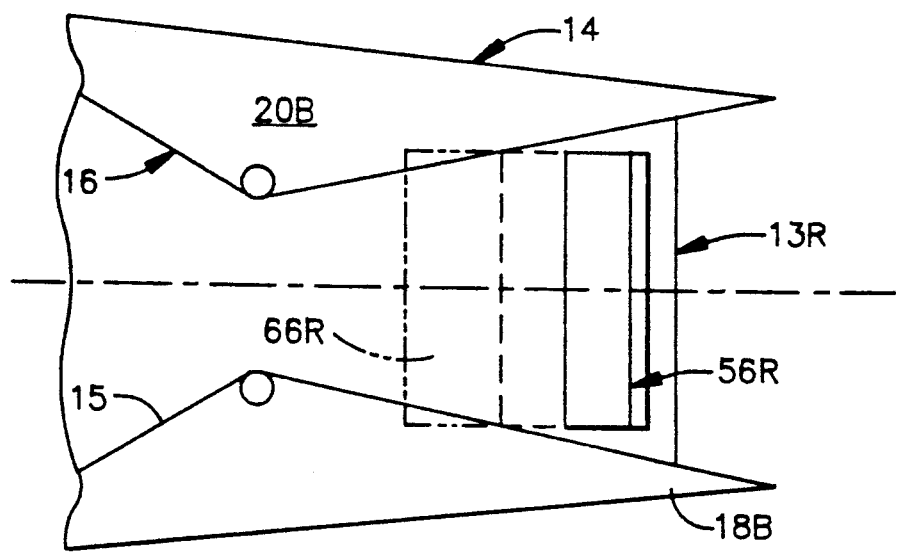
Figure 12:
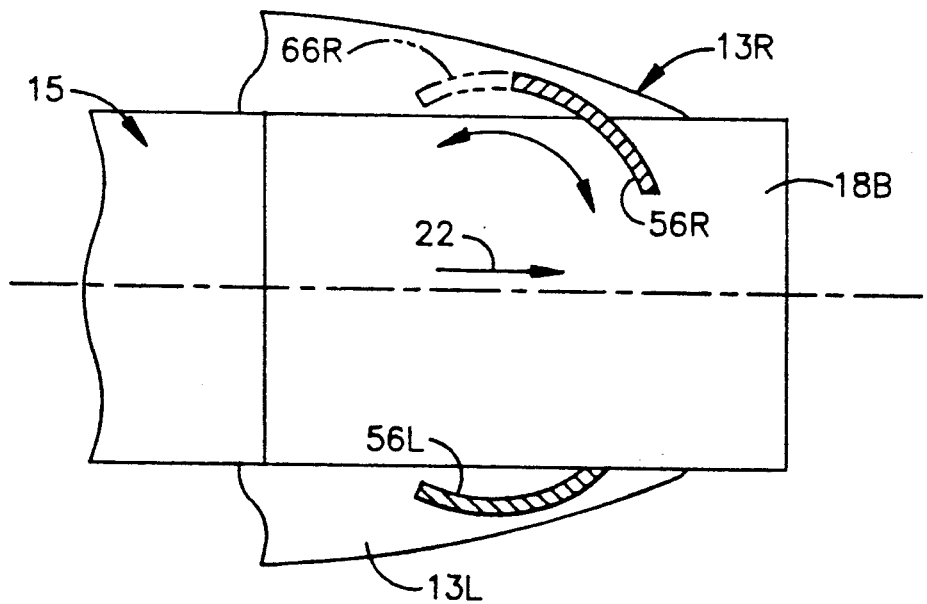

FIB. 5B is a partial perspective, top view of an upper divergent flap which houses a retractable yaw blade according to the embodiment of the present invention depicted in FIG. 4;

FIG. 6 is a schematic side view illustration of prior art trailing edge flaps;

FIG. 7 is a schematic side view illustration depicting the inventive nozzle of FIG. 4 with a contoured yaw blade;

FIG. 8 is a schematic side-view illustration of the inventive nozzle of FIG. 4 with a straight yaw blade;

FIG. 9 is a graphical illustration which compares resultant yaw angle, as a function of blade height and flap angle, of the contoured and non-contoured yaw blades according to the present invention with the trailing edge flaps of the prior art;

FIG. 10 is a partial cutaway perspective illustration of a nozzle according to another embodiment of the present invention having yaw blades which are retractable into the sidewalls of the nozzle;

FIG. 11 is a side view, schematic illustration of the nozzle depicted in FIG. 10; and FIG. 12 is a top view, schematic illustration of the nozzle depicted in FIG. 10.

When referring to the drawings, it should be understood that like referenced numerals designate identical or corresponding parts throughout the respective figures.

THE DETAILED DESCRIPTION OF THE INVENTION

Figure 1:
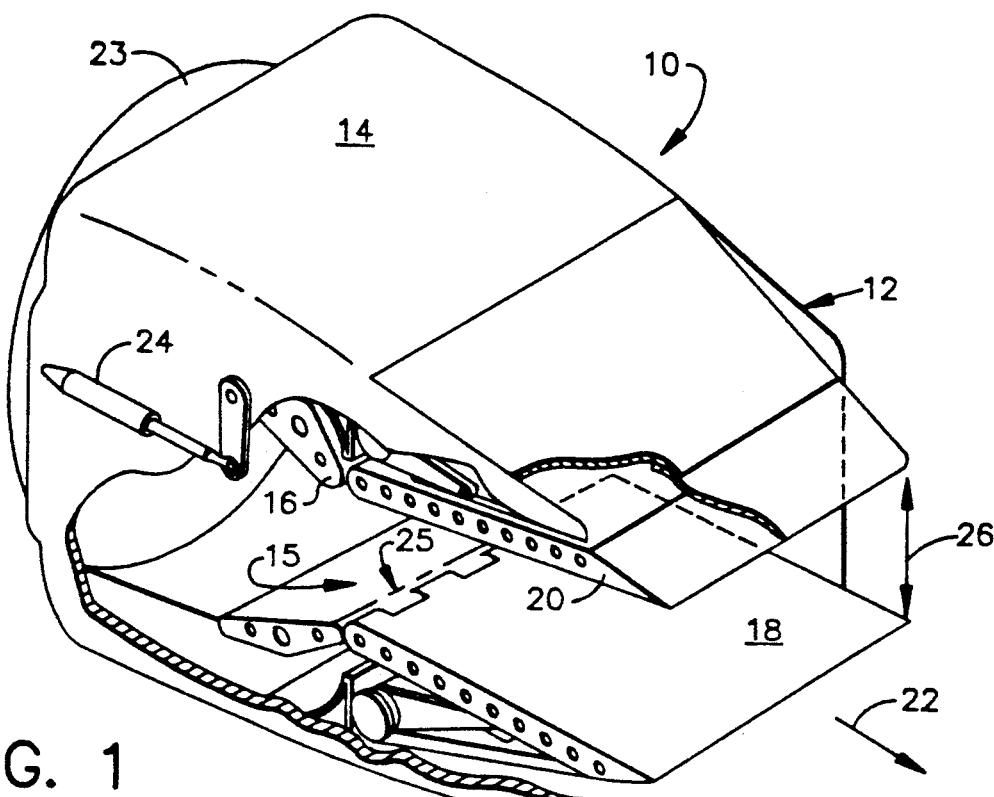
FIG. 1 is a partial cutaway perspective illustration of a prior art two-dimensional convergent-divergent (2DCD) nozzle.

In FIG. 1, a prior art two-dimensional convergent-divergent (2DCD) nozzle 10 for a gas turbine engine is provided with a sidewall 12 which is integral with a top fairing 14. Pivotally connected to the sidewall 12 is lower convergent flap 15 and upper convergent flap 16. To the aft of convergent flaps 15 and 16 are positioned upper divergent flap 20 and lower divergent flap 18. The lower convergent flap 15 and the upper convergent flap 16 as well as the lower divergent flap 18 and upper divergent flap 20 can be pivoted and tilted to change the axial width of airflow path 22. An actuator means identified by numeral 24 provides a means to control the positioning of the upper and lower convergent flaps 15 and 16 and the upper and lower divergent flaps 20 and 18, respectively.

The prior art 2DCD nozzle of FIG. 1 has a forward region 23 which attaches to a tail pipe or exhaust region of the engine (not shown). This forward region 23 is pivotally connected in prior art 2DCD nozzles to allow the airplane to turn in a desired manner. This gimballing or pivoting of the entire nozzle is effective but requires a heavy mounting trunnion since all of the nozzle thrust must be transmitted through the pivot point. The gimballed or pivoted nozzle also requires a complex installation since the entire external surface of the nozzle must move relative to the airframe. Furthermore, a set of sealing plates having a complex shape are required to eliminate gaps in the surface to effectuate efficient vectored operation. Installation is further complicated if ducting for a secondary nozzle flow is incorporated. Also, heavy mechanical components and actuating devices are needed in order to pivot the nozzle.

A distinction of the prior art 2DCD nozzle 10 of FIG. 1 is that all of the gas expansion takes place in two dimensions as opposed to an axis symmetric nozzle such as the round-type nozzle exemplified in some types of military aircraft. A two dimensional nozzle is applied for signature reasons, and for ease of vectoring in one plane, i.e., by tilting the flaps. When the flaps are moved up or down a pitching moment is generated. In FIG. 1, convergent flaps 15 and 16 accommodate the airflow (gases) to accelerate up to sonic speed (MACH I) right at the throat 25 of the nozzle. The throat is defined as the minimum cross sectional area of the nozzle. The divergent section of the nozzle 10 is comprised of divergent flaps 18 and 20 which allow the airflow 22 to accelerate supersonically so that the amount of thrust is increased.

Thus, to properly operate the engine, it is necessary to vary the throat area 25 by moving the convergent flaps 15 and 16, and to vary the exit area 26 by moving upper divergent flap 20 and lower divergent flap 18. Thus, the throat area 25 and the exit area 26 are variable and controlled to maximize the efficiency of the nozzle.

In that nozzle 10 of FIG. pivots on a vertical axis, nozzle 10 is analogous to the outboard motor on a boat. However, such a system, as has been mentioned, requires a complex installation and heavy components which, of course, are not desirable.

Figure 2:
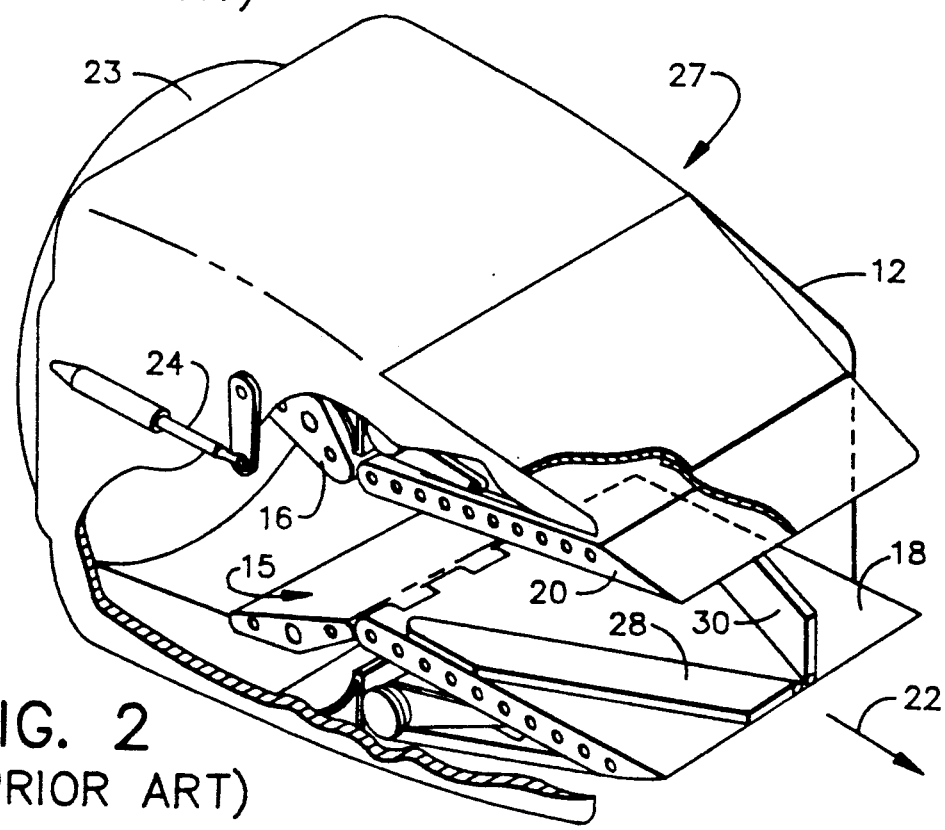
FIG. 2 is a partial cutaway perspective illustration of a prior art nozzle which embodies a three-hinge concept.

In FIG. 2, prior art nozzle 27 is provided with a hinged yaw vane 28 on the left side of the lower divergent flap 18 and a hinged yaw vane 30 on the right side of lower divergent flap 18. Hinged yaw vane 28 is depicted as being in a stowed position whereas yaw vane 30 is depicted as being in a deployed vertical position. Yaw vanes 28 and 30 are hinged to the surface of lower divergent flap 18. Similar hinged yaw vanes (not shown) are connected to upper divergent flap 20 of FIG. 2. These hinged vanes allow an airplane to be maneuvered by redirecting the airflow 22 and thus producing a yawing moment. Thus, the hinged vanes 28 and 30 of FIG. 2 would seem to be an improvement over the translated nozzle of FIG. 1. However, mounting of the hinges on the curved surfaces of the divergent flaps is a somewhat difficult procedure in that several pivot points must be accommodated on an uneven surface.

Figure 3:
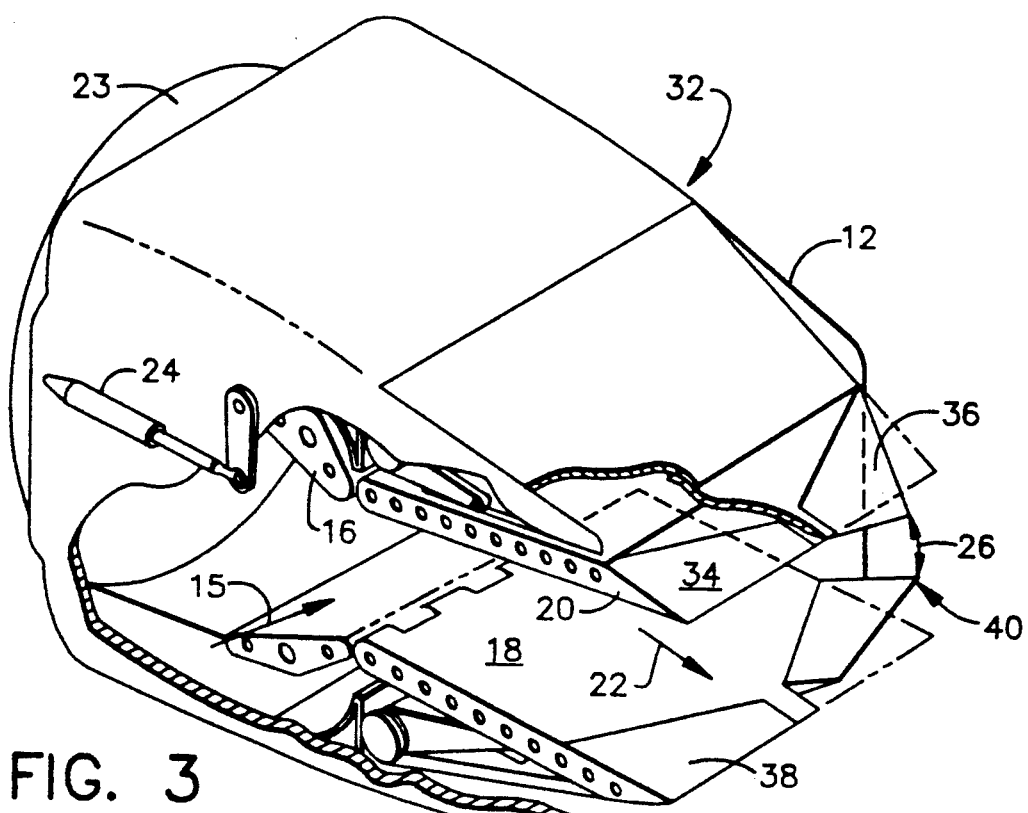
FIG. 3 is a partial cutaway perspective illustration of a prior art nozzle which embodies a trailing-edge flap concept.

In FIG. 3, a prior art nozzle 32 is provided with trailing edge flaps which are indicated by numerals 34, 36, 38, and 40. Trailing edge flaps are pivotally connected to the upper and lower divergent flaps 20 and 18 and comprise a portion of the divergent flaps themselves with left upper trailing edge flap 34 and right upper trailing edge flap 36 providing the aftward region of upper divergent flap 20, left lower trailing edge flap 38 and right lower trailing edge flap 40 provide the aftward region of lower divergent flap 18.

Trailing edge flaps have been tested on scale models and were found to produce useful amounts of yaw vectoring but suffer from poor initial effectiveness and may pose a structure and materials problem.

In FIG. 4, exhaust nozzle 42 of the present invention is depicted. Exhaust nozzle 42 is provided with a yaw blade 44 which is retractable into lower divergent flap 18A. Yaw blade 44 is located on the left-hand side 45 of lower divergent flap 18A. The lower divergent flap 18A is provided with a cavity which allows the yaw blade 44 to be completely recessed inside the lower divergent flap 18A. When desired, yaw blade 44 can be moved into a position which obstructs the airflow path 22 so as to cause a change in direction of the airflow path and a resulting yaw moment.

Figure 4A:
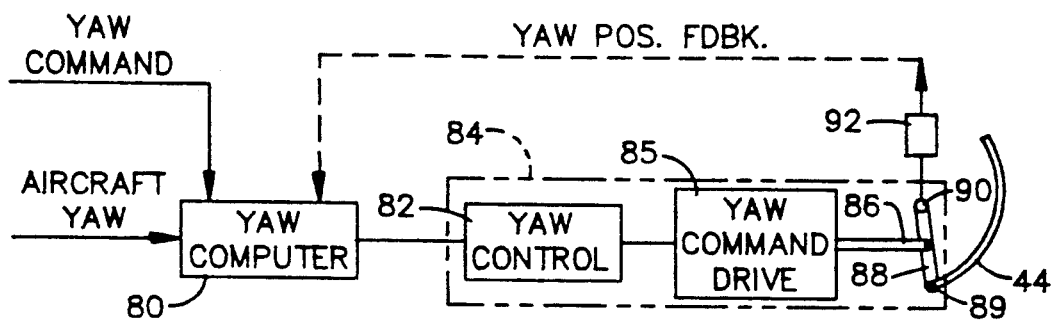
FIG. 4A is an illustration of one form of yaw blade control arrangement.

Referring briefly to FIG. 4A, each yaw blade 44 is responsive to a pilot command to effect a desired yaw of an aircraft on which the engines and associated nozzles 42 are mounted. A yaw computer 80 receives the desired command and a signal indicative of actual aircraft yaw. Computer 80 produces a signal which is sent to yaw control 82. 35 Yaw control 82 is a part of the actuator means 84 which further includes yaw command drive 85, drive rod 86, and rod lever 88. Yaw control 82 conditions the error signal to yaw command drive 85 which is connected to drive rod 86. Drive rod 86 is connected to rod lever 8 which is pivotally connected to yaw blade 44 at pivotable connection point 89. In operation, drive rod 86 moves lever arm 88 about fixed pivot pin 90 to selectively extend and retract blade 44. A position sensor adjacent to pivot pin 90 relays information relating to the positioning of the yaw blade 44 back to yaw computer 80.

Yaw blade 46 is located on the right-hand side 47 of lower divergent flap 18A and is angularly oriented to yaw blade 44. In FIG. 4, yaw blade 46 is indicated as being in a recessed position whereas the left-side yaw blade 44 is in an open and exposed position. An actuator means such as actuator means 84 is connected to and implements the respective positions of each yaw blade of the present invention. Yaw blades (not shown in FIG. 4) are also provided for upper divergent flap 20A in a manner similar to the yaw blades depicted in lower divergent flap 18A. Thus, upper and lower divergent flaps 20A and 18A both are provided with right and left side yaw blades.

The yaw blades of the upper and lower divergent flaps (20A, 18A) are operated in three general modes of operation. The first mode of operation is when all of the yaw blades in the upper and lower divergent flaps (18A, 20A) are in a retracted or recessed position so as not to be exposed to the airflow path 22. A second mode of operation is when the right upper yaw blade on the upper divergent flap and the right lower yaw blade on the lower divergent flap extend into the airflow path while at the same time the left upper yaw blade on the upper divergent flap and the left lower yaw blade on the lower divergent flap are in a retracted or a recessed position. Alternatively, the left upper yaw blade and the left lower yaw blade can be exposed to the airflow path 22 while at the same time the right upper yaw blade and the right lower yaw blade remain in a recessed or retracted position. Of course, the further the yaw blades are extended into the airflow path 22, the greater the resultant yaw angle.

The yaw blade 44 depicted in FIG. 4 has a shape that is similar to a snow-plow blade (cylindrical shell). Air in airflow path 22 impacts upon the concave side of the yaw blade 44. Actuator means which are computer-linked to the control system of the aircraft control the movement of the yaw blades (e.g. yaw blade 44) and the movement of convergent flaps 15 and 16 and divergent flaps 18A and 20A.

Figure 5A:
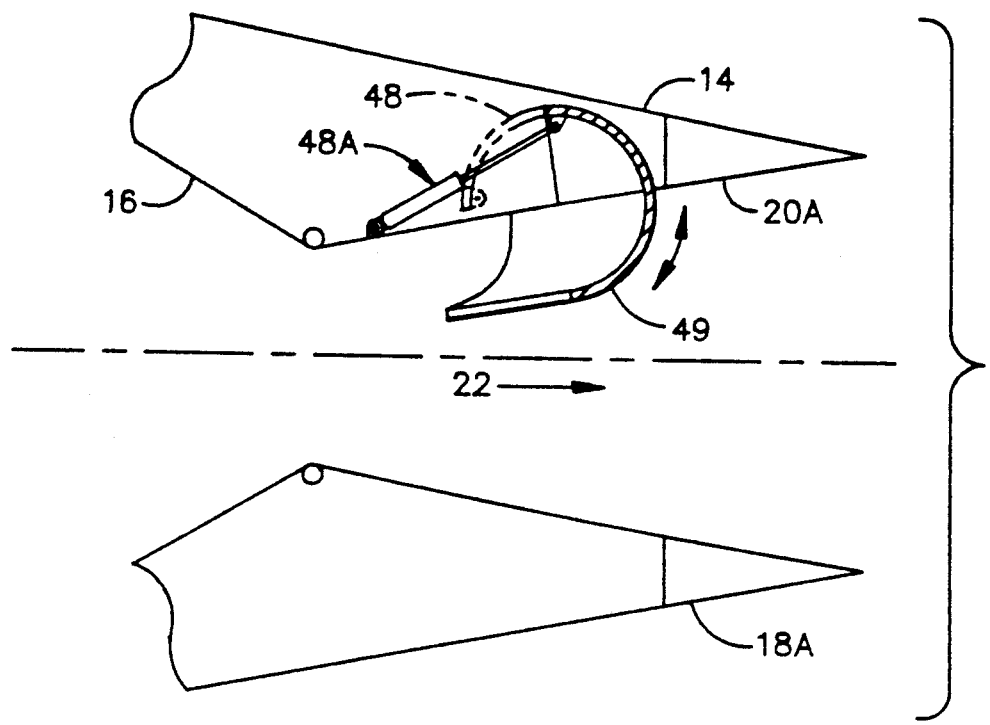
FIG. 5A is a cross-sectional illustration taken along line 5A—5A of FIG. 5B.
Figure 5B:
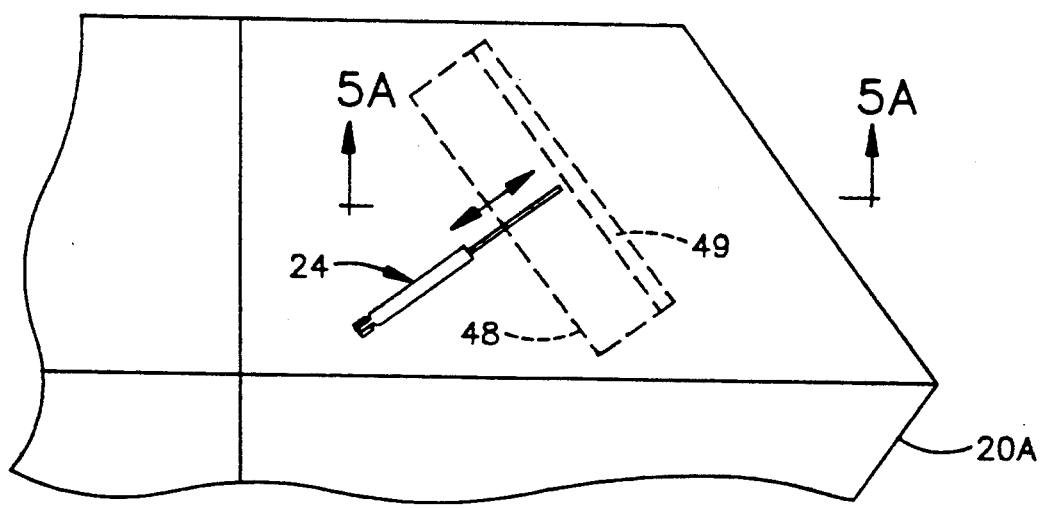

FIG. 5B is a partial perspective top-view of the left side of upper divergent flap 20A according to the present invention. A cavity 48 houses a left-side yaw blade 49. FIG. 5A is a cross-sectional illustration taken along line 5A—5A of FIG. 5B and demonstrates yaw blade 49 of upper divergent flap 20A in an open and exposed position to airflow path 22. Airflow path 22 is, of course, positioned between upper divergent flap 20A and lower divergent flap 18B.

In FIG. 6, a side view schematic illustration of the prior art trailing edge flaps 34, 38 (see FIG. 3) depicts the flaps as being opened to a flap angle, indicated by numeral 60, of approximately 45°. The maximum blade height, blade height being indicated by numeral 62, of the flaps 34 and 38 (FIG. 6) occurs at a flap angle of 45°.

In FIG. 7, a side view illustration of the contoured or snow-plow shaped yaw blade 44 according to one embodiment of the present invention is depicted as extending into the airflow path 22. The contoured yaw blade 44 achieves a desired resultant yaw angle with much less blade height than the trailing edge flaps of the prior art FIG. 6. Thus a desired yaw angle can be implemented faster and with less actuating hardware than is the case with the prior art. A graphical comparison of the contoured yaw blades 44 and the prior art trailing edge flaps (34 and 38 of FIG. 6) is discussed subsequently in the commentary concerning the graphical illustration of FIG. 9.

FIG. 8 is a side view illustration according to a second embodiment of the present invention which depicts non-contoured or straight yaw blades 54 extending into the airflow path 22. The yaw blades 54, like the contoured yaw blades 44, have the attribute of delivering a significant resultant yaw angle without necessitating a great amount of blade height. In fact the yaw blades 54 and contoured yaw blades 44 deliver approximately the same resultant yaw angle up to a blade height of about 30% as is demonstrated in FIG. 9. However, at heights over 30% of blade height, the contoured blades 44 are quicker to respond and require less blade height to achieve a desired resultant yaw angle than the yaw blades 54.

FIG. 9 is a graph which compares resultant yaw angle in degrees of the trailing edge flap (FIG. 6), contoured yaw blade (FIG. 7), and straight yaw blade (FIG. 8) as a function of blade height and flap angle. Broken line 70 charts the resultant yaw angle of the contoured yaw blades 44 as a function of blade height and flap angle. Line 72 charts the resultant yaw angle of straight yaw blades 54 (FIG. 8) as a function of blade height and flap angle and line 74 charts the resultant yaw angle of trailing edge flaps 38 (FIG. 6) as a function of blade height and flap angle.

In the present invention (see FIG. 7 and 8), the yaw blades (44, 54) do not have to move as many degrees as in the prior art trailing edge flaps of FIG. 6 to achieve a desired yaw angle (see FIG. 9). Thus, the actuating components can be smaller and less heavy since the yaw blades of the present invention do not need to travel as many degrees to obtain the same desired result. Also, the present invention requires less actuating force to implement the yaw blades in a desired position, and are thus faster to implement.

With reference to FIG. 10, a nozzle 43 according to another embodiment of the present invention is provided with retractable yaw blades which are housed in the sidewalls of the nozzle (e.g. sidewall 13A). Sidewall positioned-retractable yaw blades have practical application for nozzles having a fixed exit area. Right side yaw blade 56R is housed in right sidewall 13R. A left-side yaw blade 56L (see FIG. 2) is housed in left sidewall 13L (sidewall 13L is cutaway in FIG. 10 for purposes of illustration). The right -side yaw blade 56R and the left-side yaw blade 56L can be actuated to extend into the airflow path 22 (although preferably the yaw blades 56R and 56L do not extend into the airflow path 22 at the same time). When extended into the airflow path 22, the yaw blades 56R and 56L are positioned between lower divergent flap 18B and upper divergent flap 20B.

The movement of yaw blades 56L and 56R is controlled with the aid of actuator similar to actuator means 84 of FIG. 4A. The yaw blades 56L and 56R have three modes of operation. One mode of operation is when both yaw blades 56R and 56L are in a recessed or retracted position so as not to be exposed to airflow path 22. A second mode of operation is When yaw blade 56L is exposed to the airflow path 22 and yaw blade 56R is not exposed to airflow path 22. The third mode of operation is when yaw blade 56R is exposed to the airflow path 22 and yaw blade 56L is not exposed to the airflow path 22.

With reference to FIG. 11, the left sidewall 56L is provided with a cavity 66L which provides a recessable area for the yaw blade 13L. Yaw blade 13L is shown in an extended position in FIG. 11. In FIG. 12, right-side cavity 66R provides a housing for right-side yaw blade 56R. Yaw blade 56R is depicted in FIG. 12 as extending into the airflow path 22 with the airflow path 22 impacting upon the concave side of the yaw blade 56R while left-side yaw blade 56L is in a recessed position.

Thus, the yaw vectoring blade of the present invention will bring added benefits to maneuverability of aircraft as well as added fuel efficiency as a result of the reduction in bulk of actuating components. In the two embodiments of the present invention the sidewalls (13R, 13L) or the upper and lower divergent flaps (20A, 18A) are used as a housing means from which the respective yaw blades can be extended into and or recessed from the airflow path 22.

The foregoing detailed description is intended to be illustrative and non-limiting. Many changes and modifications are possible in light of the above teachings. Thus, it is understood that the invention may be practiced otherwise than it is specifically described herein and still be within the scope of the appended claims.

What is claimed is:

1. An exhaust nozzle for controlling exit angle of exhaust gases from a gas turbine engine, said exhaust nozzle comprising:
   at least one divergent flap;
   at least one yaw blade moveable in a linear motion from a retracted position with said at least one divergent flap and in a direction generally normal to an airflow path of the exhaust gases from said exhaust nozzle, said at least one yaw blade having a cylindrical snow-plow shape and wherein the airflow path impacts the concave side of said at least one yaw blade; and
   actuating means connected to said at least one yaw blade for selectively moving said blade along a path normal to the path of the exhaust gases.

2. An exhaust nozzle for controlling exit angle of exhaust gases from a gas turbine engine, comprising:
   first and second opposed divergent flaps;
   first and second yaw blades selectively retractable into said first divergent flap and third and fourth yaw blades selectively retractable into said second divergent flap, each of said blades being moveable along a linear path generally normal to the exhaust gas flow path at a surface of a corresponding one of said flaps;

said second yaw blade being angularly oriented to said first yaw blade and said fourth yaw blade being angularly oriented to said third yaw blade, each of said yaw blades having a cylindrical snow-plow shape and wherein the airflow path impacts the concave side of said yaw blades; and actuating means connected to said each of yaw blades for selectively extending said yaw blades into a desired position in the exhaust gas airflow path.

3. The exhaust nozzle of claim 2 wherein said actuator advances said blades into the exhaust gas flow path by driving said blades along the path defined by the snow-plow shape.

* * * * *